United States Patent [19]
Langford et al.

[11] Patent Number: 6,134,073
[45] Date of Patent: *Oct. 17, 2000

[54] METHODS AND APPARATUS FOR CONTROLLING MOTION OF RECORDING MEDIA

[75] Inventors: Stephen Paul Langford; Benjamin Alec Willcocks, both of Bristol, United Kingdom

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,708

[22] Filed: May 9, 1997

Related U.S. Application Data

[63] Continuation of application No. 08/396,035, Feb. 28, 1995.

[30] Foreign Application Priority Data

Mar. 8, 1994 [GB] United Kingdom .................. 9404421

[51] Int. Cl.⁷ .................................................. G11B 5/584
[52] U.S. Cl. ................................ 360/77.13; 360/73.08; 360/73.12; 360/73.11
[58] Field of Search ........................... 360/10.2, 51, 64, 360/73.11, 27, 73.04, 73.07, 73.09, 70, 72.2, 73.08, 77.13, 73.12; 386/78, 79, 80

[56] References Cited

U.S. PATENT DOCUMENTS

| | | | |
|---|---|---|---|
| 3,651,276 | 3/1972 | Clark | 179/100.2 |
| 4,613,914 | 9/1986 | Kobori et al. | 360/10.2 X |
| 4,672,474 | 6/1987 | Rodal | 360/70 |
| 4,954,902 | 9/1990 | Furuhata et al. | 360/10.2 |
| 5,142,422 | 8/1992 | Zook et al. | 360/54 |
| 5,253,130 | 10/1993 | Kaaden et al. | 360/77.15 |
| 5,324,943 | 6/1994 | Rundt et al. | 250/328 |
| 5,353,172 | 10/1994 | Alioth | 360/70 |
| 5,357,382 | 10/1994 | Lee | 360/64 |
| 5,671,260 | 9/1997 | Yamauchi et al. | 375/372 |

FOREIGN PATENT DOCUMENTS

| | | |
|---|---|---|
| 0 103 463 | 3/1984 | European Pat. Off. . |
| 0 224 186 | 6/1987 | European Pat. Off. . |
| 0 285 029 | 10/1988 | European Pat. Off. . |
| 2 181 313 | 4/1987 | United Kingdom . |
| 2 217 051 | 10/1989 | United Kingdom . |
| WO 90 06573 | 6/1990 | WIPO . |

*Primary Examiner*—Paul Loomis
*Assistant Examiner*—James L Habermehl

[57] ABSTRACT

During retrieval of data from tape in a helical scan tape drive mechanism with a rotary head drum, movement of tape past the drum by a capstan is controlled to keep the tracks recorded on the tape in alignment with paths followed by the heads. A time interval is measured between occurrence of a drum position pulse generated at a specific angular position of the drum, and detection of reference signals included in the tracks (such as specific portions, with known bit patterns, of the data in the tracks). The capstan is operated to keep this interval equal to a set reference value. If a change in the reference value is required, such as at a transition between data recordings made at different times, the tape is moved at a slower than normal speed, and multiple measurements are made of the time interval as it cycles through a range of values in consequence of the changed tape speed. The mean value of these multiple measurements is used as the new reference value.

26 Claims, 7 Drawing Sheets

METHODS AND APPARATUS FOR CONTROLLING MOTION OF RECORDING MEDIA

This application is a continuation of application Ser. No. 08/396,035 filed Feb. 28, 1995.

TECHNICAL FIELD

This invention relates to methods and apparatus for controlling motion of recording media, and particularly, though not exclusively, to methods and apparatus for controlling motion of elongate magnetic tape media past a rotating helical scan transducer.

BACKGROUND ART

It is already known to provide reliable storage and retrieval of large volumes of digital data, such as computer data, in particular by means of the DDS (Digital Data Storage) format defined in ISO/IEC Standard 10777:1991 E.

In the DDS system an elongate recording media comprising tape coated with a magnetic medium is moved by a motor-driven capstan along a path wrapped partially around a transducer comprising a rotating drum carrying one or more electromagnetic heads. The plane of rotation of the drum is disposed at an angle to the plane of movement of the tape, so that each head traverses the tape along successive tracks extending across the width of the tape at an angle to its centreline.

Typically the precise location of each track is determined during recording of data on the tape by the position relative to the tape of write heads on the drum. To ensure optimum retrieval of data from the tape, it is desirable for read heads on the drum to follow paths across the tape which are at essentially identical positions to those followed by the write heads during data recording. This in turn requires control during data retrieval of relative motion between the tape and the drum, by controlling rotation of the drum and/or controlling movement of the tape by the capstan.

One method of providing such control is described, in the context of a helical scan video tape recorder, in U.S. Pat. No. 4,954,902. In the system described therein horizontal video synchronizing signals are recorded at multiple equally-spaced locations along each track. A position or head-exchange signal is generated during each revolution of the rotating drum, at a predetermined angular position. During playback (equivalent to data retrieval) this signal is used to generate pulses which are phase-locked to the position signal and the times of occurrence of which are compared with those of respective synchronizing signals detected on the tape. The capstan is controlled to provide relative motion of the tape and the head drum so that a predetermined tracking time period (half the interval between pulses) is maintained between occurrence of each pulse and detection of each synchronizing signal.

Although this system provides acceptable results and is in principle applicable to the DDS system, there is a practical problem in the case of data storage. Whereas video signals inherently contain a convenient series of regularly-spaced synchronization signals (the video horizontal sync signals), computer data do not, and it is not necessarily convenient to insert corresponding tracking signals at regularly spaced points. Furthermore, the system described in U.S. Pat. No. 4,954,902 assumes that the synchronization signals (and thus the tracks) are always spaced from the edge of the tape by a predetermined distance; however, in practice the position of the tracks relative to the edge of the tape is not very tightly controlled, and this can lead to substantial variations between different recordings in the time interval between occurrence of the drum position signal and occurrence of a tracking signal. Thus, if a tape contains several data recordings made at different times, there can be an abrupt change in the required tracking time period at each transition between recordings. The system of U.S. Pat. No. 4,954,902 does not address this problem.

It is an object of this invention to provide a method and apparatus for controlling the motion of media in, for example, a DDS mechanism using a tracking time period to control tape movement, and which can accommodate such changes.

DISCLOSURE OF INVENTION

According to one aspect of this invention there is provided a method of controlling motion of media carrying data relative to a rotating transducer for retrieving data from said media, said data being recorded in tracks extending across said media, each said track including at least one reference signal, a position signal being generated at a predetermined angular position of said transducer in each revolution thereof, delay between occurrence of said position signal and detection of said reference signal being measured, and relative motion between said media and said transducer being controlled to maintain said measured delay in a predetermined relationship to a reference value, wherein said reference value is determined by:

causing relative motion between said media and said transducer to occur at a speed different from that occurring during normal retrieval of data from said media;

acquiring multiple measurements of said delay; and determining said reference value in dependence upon said multiple measurements.

According to another aspect of this invention there is provided apparatus for controlling motion of media carrying data relative to a rotating transducer for retrieving data from said media, said data being recorded in tracks extending across said media and each said track including at least one reference signal, comprising:

means for producing motion of said media relative to said transducer;

means for detecting said reference signals;

means for generating a position signal at a predetermined angular position of said transducer in each revolution thereof;

means for measuring delay between occurrence of said position signal and detection of said reference signal; and means for controlling said relative motion between said media and said transducer to maintain said measured delay in a predetermined relationship to a reference value; said reference value being determined by:

operating said motion-producing means to produce relative motion between said media and said transducer at a speed different from that occurring during normal retrieval of data from said media;

operating said delay-measuring means to acquire multiple measurements of said delay; and determining said reference value in dependence upon said multiple measurements.

BRIEF DESCRIPTION OF DRAWINGS

Methods and apparatus in accordance with this invention for controlling motion of recording media in a DDS data storage mechanism will now be described, by way of example, with reference to the accompanying drawings, in which.

BEST MODE FOR CARRYING OUT THE INVENTION, & INDUSTRIAL APPLICABILITY

The data storage apparatus now to be described utilizes a helical scan technique for storing data in oblique tracks on a recording tape in a format similar to that used for the storage of PCM audio data according to the DAT Conference Standard (June 1987, Electronic Industries Association of Japan, Tokyo, Japan). The present apparatus is, however, adapted for storing computer data rather than digitized audio information.

Figure 1:
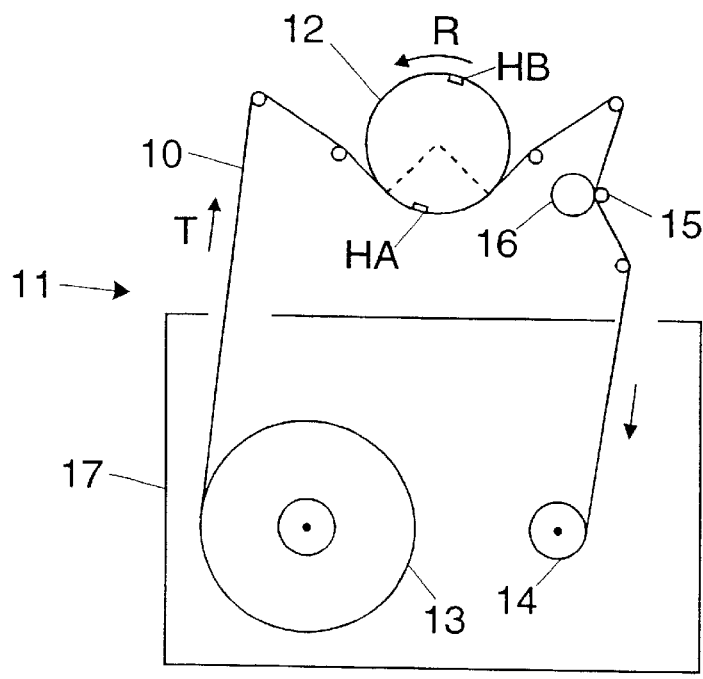
FIG. 1 is a diagram illustrating the main physical components of a tape deck employing helical scan recording.
Figure 2:
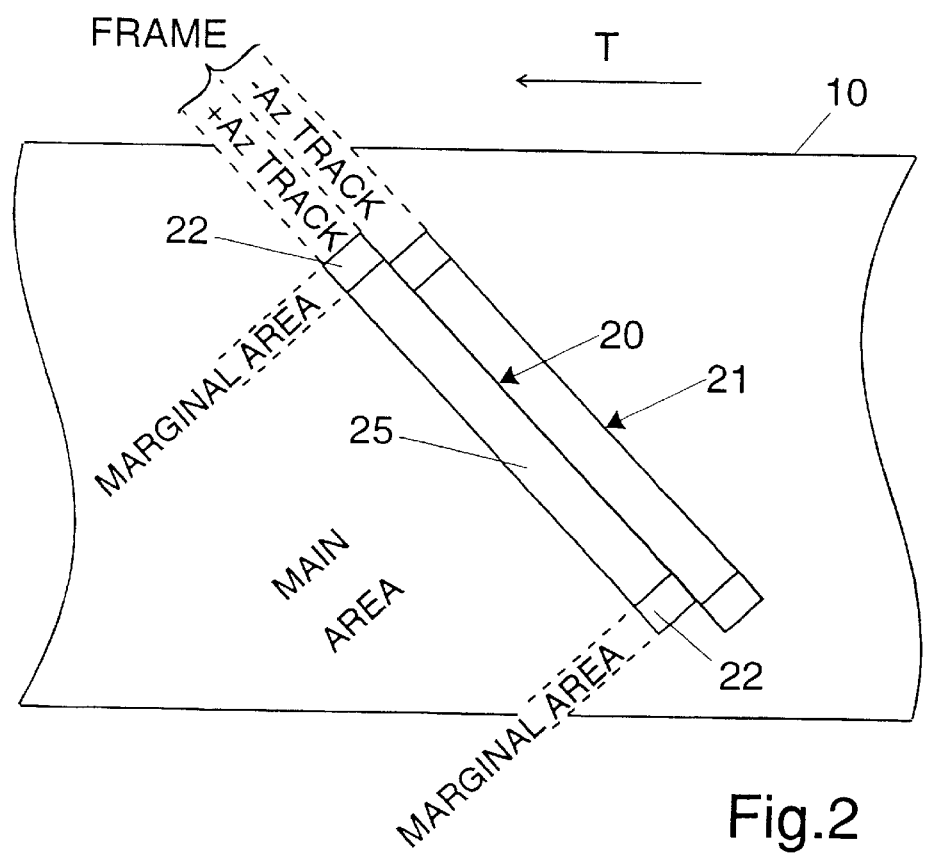
FIG. 2 is a diagrammatic representation of two data tracks recorded on tape using helical scan recording.

FIG. 1 shows the basic layout of a helical-scan tape deck 11 in which tape 10 from a tape cartridge 17 passes at a predetermined angle across a rotary head drum 12 with a wrap angle of approximately 90°. In operation, the tape 10 is moved in the direction indicated by arrow T from a supply reel 13 to a take-up reel 14 by rotation of a capstan 15 against which the tape is pressed by a pinch roller 16; at the same time, the head drum is rotated in the sense indicated by arrow R. The head drum 12 houses two read/write heads HA, HB angularly spaced by 180°. In known manner, these heads HA, HB are arranged to write overlapping oblique tracks 20, 21 respectively across the tape 10 as shown in FIG. 2. The track written by head HA has a positive azimuth while that written by head HB has a negative azimuth. Each pair of positive and negative azimuth tracks, 20, 21 constitutes a frame.

The basic format of each track as arranged to be written by the present apparatus is illustrated in FIG. 2. Each track comprises two marginal areas 22 and a main area 25. The main area 25 is used to store data provided to the apparatus (main data), together with certain auxiliary information. The items of auxiliary information are known as sub codes and relate, for example, to the logical organization of the main data, its mapping onto the tape, certain recording parameters (such as format identity, tape parameters etc.), and tape usage history. The main area 25 also includes synchronization bytes ('sync bytes') which enable the boundaries between successive data bytes stored on the tape to be identified, and which are also used to generate timing signals for controlling tape movement so that the heads HA, HB follow the tracks accurately, by measuring the time interval between signals indicative of the drum position and reference signals including the sync bytes, in a manner similar to that described in the above-mentioned U.S. Pat. No. 4,954, 902.

Figure 3:
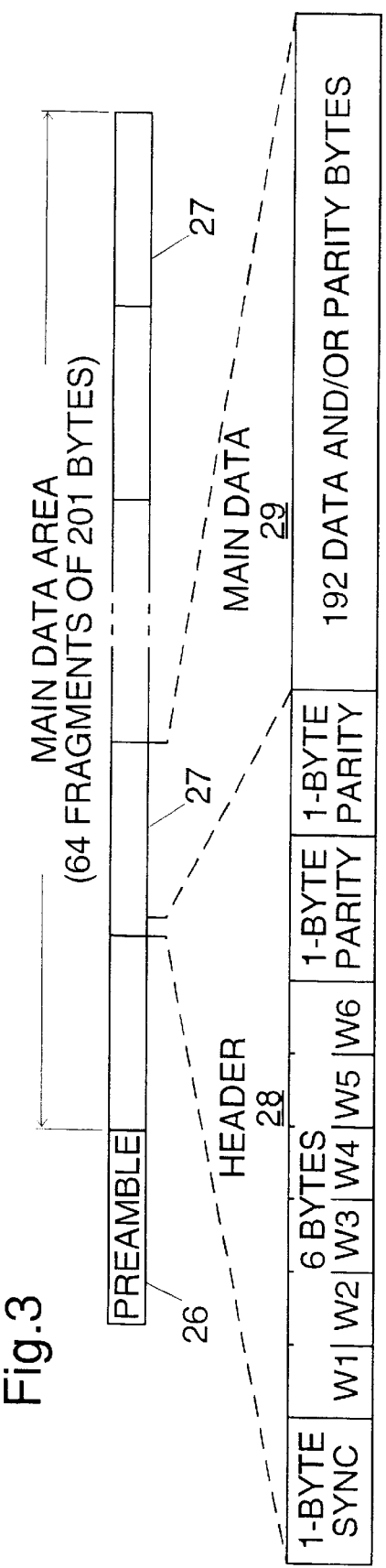
FIG. 3 is a diagrammatic representation of the format of a main data area of a data track.

The data format of the main area 25 of a track is illustrated in FIG. 3. The main area is composed of a pre-amble block 26, followed by sixty-four sections or 'fragments' 27 each two hundred and one bytes long. The block 26 is a pre-amble which contains timing data patterns to facilitate timing synchronization on playback. The fragments 27 make up the 'Main Data Area'. Each fragment 27 in the Main Data Area comprises a nine-byte 'Header' region 28 and a one hundred and ninety-two byte 'Main Data' region 29, the compositions of which are shown in the lower part of FIG. 3.

The Header region 28 is composed of a sync byte as mentioned above, six information-containing bytes W1 to W6, and two parity bytes. The first information byte W1 contains a six-bit Fragment ID which identifies the fragment within the main area 25. Byte W2 contains an Area ID sub code in its four most significant bits, and a frame number in its four least significant bits which is incremented mod 16 between consecutive frames. Bytes W3 to W6 contain sub codes providing information about the contents of the track and the history of usage of the tape. The parity bytes comprise a sixteen-bit cyclic redundancy check (CRC) code derived from the contents of the remainder of the Header region.

The Main Data region 29 of each fragment 27 is composed of one hundred and ninety-two bytes (comprising six successive thirty-two byte blocks) generally constituted by main data and/or main-data parity. However, it is also possible to store sub codes in the Main Data region if desired.

In summary, main data are stored in the Main Data regions 29 of the Main Data Area fragments 27 of each track, while sub codes can be stored both in the Header and Main Data regions 28, 29 of Main Data Area fragments 27.

Figure 4:
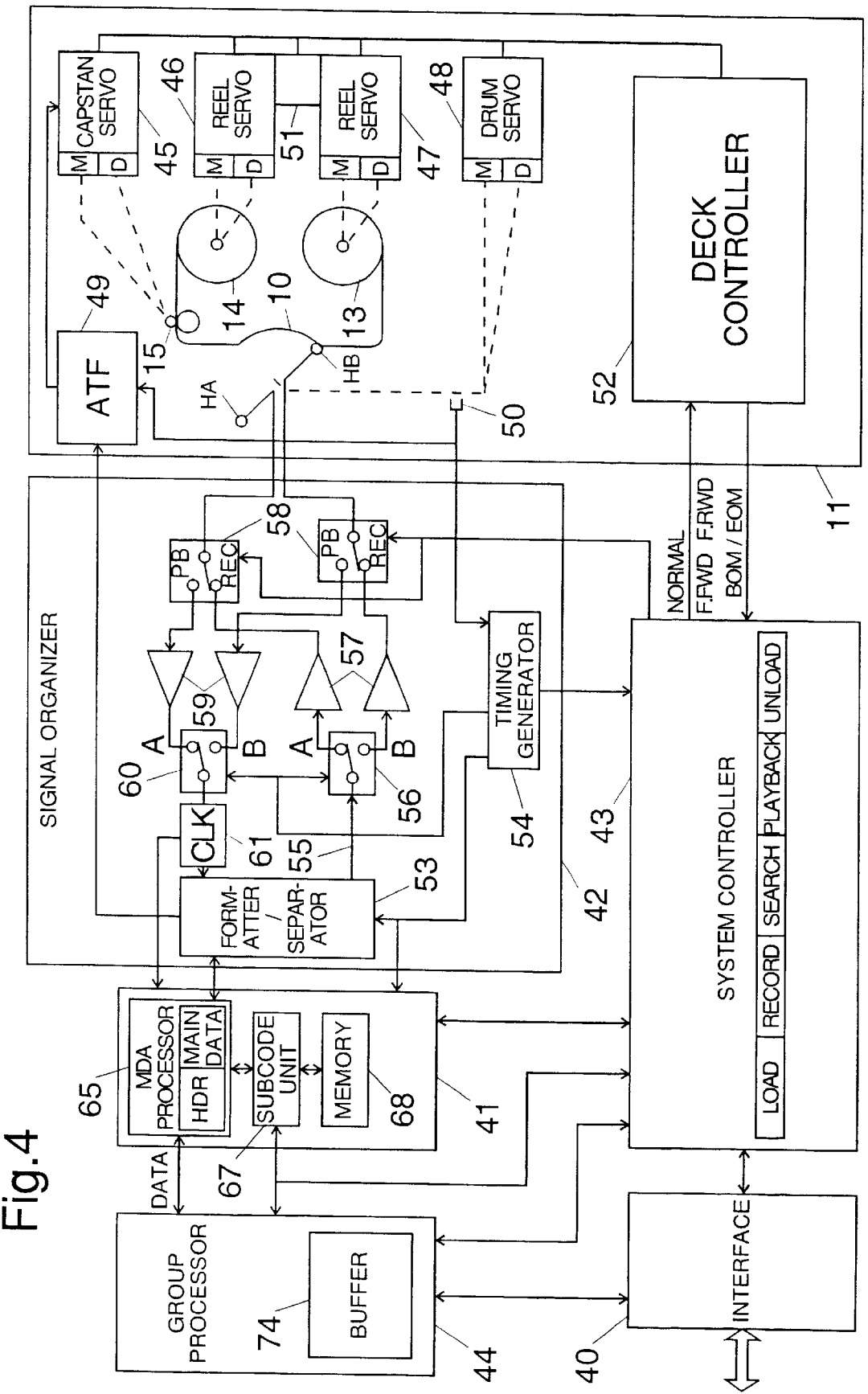
FIG. 4 is a block diagram of the main components of the data storage apparatus.

FIG. 4 is a block diagram of the data storage apparatus in its entirety including the tape deck 11 already described in part with reference to FIG. 1. In addition to the tape deck, the apparatus includes an interface unit 40 for interfacing the apparatus with a computer (not shown); a group processor 44 and a frame data processor 41 for processing main data and sub codes into and out of a Main Data Area fragment 27; a signal organizer 42 for composing/decomposing the signals for writing/reading a track and for appropriately switching the two heads HA, HB; and a system controller 43 for controlling the operation of the apparatus in response to commands received from a computer via the interface unit 40. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The interface unit 40 is arranged to receive the commands from the computer and to manage the transfer of data records and logical data segmentation marks between the apparatus and computer. Upon receiving a command from the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 44 is arranged to segment the main data provided to it in the form of data records into data packages each containing an amount of data corresponding to a fixed number (group) of frames (for example, twenty two). This segmentation is effected without regard to the logical organization of the data (that is, how it is divided into records). Information regarding the logical segmentation of the data (record divisions, file marks) is stored in an index which is generated by the processor 44 and which forms the last portion of data making up a group. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, three) group's worth of data.

Once a group, including its index, has been assembled, it is transferred a frame at a time to the frame data processor 41. Conceptually there is no need for the frame data processor 41 to be aware of the grouping of frames as the group processor 44 could simply pass it a frame's worth of main data at a time together with the appropriate sub codes. However, in order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

When data are being read from tape, the group processor 44 is arranged to receive main data on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

To facilitate the assembly of frame data back into a group's worth of data, each frame can be tagged with an in-group sequence number when the frame is written to tape. This in-group number can be provided as a sub code that, for example, is included at the head of the Main Data region of the first fragment in the Main Data Area of each track of a frame. The sub code is used on playback to determine where the related frame data are placed in the buffer 74 when passed to the group processor 44.

The frame data processor 41 functionally comprises a Main-Data-Area (MDA) processor 65 and a sub code unit 67 with an associated electronic memory 68 for tape usage data (in practice, these functional elements may be constituted by a single microprocessor running appropriate processes under program control).

The sub code unit 67 is arranged to provide sub codes to the processor 65 as required during recording and to receive and distribute sub codes from the processor 65 during playback. Dependent on their information contents, sub codes may be generated/required by the group processor 44 or the system controller; the Area ID sub code is, for example, determined by/used by the controller 43. In the case of non-varying sub codes such as certain recording parameters, the sub codes may be permanently stored in the unit 67. Furthermore, frame-dependent sub codes such as absolute frame number, may conveniently be generated by the sub code unit 67 itself.

With regard to the tape usage sub codes, these are read off from the system area of a tape upon first loading and stored by the unit 67 in the memory 68. During a tape usage session, the tape usage data held in the memory 68 are updated by the unit 67 as appropriate on the basis of inputs received from the processors 44, 65 and the controller 43; thus if a record is kept of the number of main data frames read/written (either directly or in terms of the number of groups read and written), then these data must be continually updated by the unit 67 as a result of inputs from the processor 65 (or possibly the processor 44 if groups are counted). At the end of a tape usage session, the contents of the memory 68 are stored to tape within a log area of the tape system area, the latter being rewritten at the end of each session of usage. The multiple storage of the tape usage sub codes within the log area together with associated parity information, ensures a very high probability that the tape usage sub codes can be read back from the tape even in the presence of tape defects or other similar degradations.

The MDA processor 65 is arranged to process a frame's worth of main data at a time together with the associated sub codes in the fragment Header regions. Thus during recording, the processor 65 receives a frame's worth of main data from the group processor 44 together with sub codes from the unit 67. On receiving the main data the processor 65 interleaves the data, and calculates error correcting codes and parity values, before assembling the resultant data and sub codes to output the Main-Data-Area fragments for the two tracks making up a frame. Before assembling the main data with the sub codes, scrambling (randomizing) of the data may be effected to ensure a consistent RF envelope independent of the data contents of a track signal.

During playback, the processor 65 effects a reverse process on the two sets of Main-Data-Area fragments associated with the same frame. Unscrambled, error-corrected and de-interleaved main data are passed to the group processor 44 and sub codes are separated off and distributed by the unit 67 to the processor 44 or system controller 43 as required.

The signal organizer 42 comprises a formatter/separator unit 53 which during recording (data writing) is arranged to assemble Main-Data-Area fragments provided by the frame data processor 41, to form the signal including sync bytes to be recorded on each successive track. The necessary preamble patterns are also inserted into the track signals where necessary by the unit 53. Timing signals for coordinating the operation of the unit 53 with rotation of the heads HA, HB are provided by a timing generator 54 fed with drum position signals output by a pulse generator 50 responsive to head drum rotation and located in the tape deck 11. The track signals output on line 55 from the unit 53 are passed alternately to head HA and head HB via a head switch 56, respective head drive amplifiers 57, and record/playback switches 58 set to their record positions by the system controller 43. The head switch 56 is operated by appropriate timed signals from the timing generator 54.

During playback (data reading) the track signals alternately generated by the heads HA and HB are fed via the record/playback switches 58 (now set by the system controller 43 to their playback positions), respective read amplifiers 59, a second head switch 60, and a clock recovery circuit 61, to the input of the formatter/separator unit 53. The operation of the head switch 60 is controlled in the same manner as that of the head switch 56. The unit 53 now serves to generate signals indicating the timing of the Header regions (incorporating the sync bytes) of selected fragments in the track signals, to supply the timing signals to an ATF circuit 49 in the tape deck 11, and to pass the Main-Data-Area fragments to the frame data processor 41. Clock signals are also passed to the processor 41 from the clock recovery circuit 61.

The tape deck 11 has four servos, namely a capstan servo 45 for controlling the rotation of the capstan 15, first and second reel servos 46, 47 for controlling rotation of the reels 13, 14 respectively, and a drum servo 48 for controlling the rotation of the head drum 12 (FIG. 1). Each servo includes a motor M and a rotation detector D both coupled to the element controlled by the servo. Associated with the reel servos 46, 47 is a detector 51 for sensing the ends of the tape: beginning-of-media (BOM) and end-of-media (EOM); this detector 51 may be based for example on motor current sensing, as the motor current of whichever reel is being driven to wind in tape (dependent on the direction of tape travel) will increase significantly upon stalling of the motor at BOM/EOM.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos.

The deck controller 52 is itself governed by control signals issued by the system controller 43. The deck controller 52 is arranged to output to the controller 43 signals indicative of BOM and EOM being reached.

The system controller 43 serves both to manage high-level interaction between the computer and storage apparatus and to coordinate the functioning of the other units of the storage apparatus in carrying out the basic operations of Load-Record-Search-Playback-Unload requested by the computer. In this latter respect, the controller 43 serves to coordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F.RWD).

The ATF circuit 49 is operative during playback to compare the timing of the selected Header regions in the track signal read from tape, with the drum position signal from the pulse generator 50, to provide an adjustment signal to the capstan servo 45 such that the heads HA, HB are properly aligned with the tracks recorded on the tape. Thus in this embodiment reference signals for use in controlling track following by the heads HA and HB are constituted by these selected Header regions.

Figure 5:
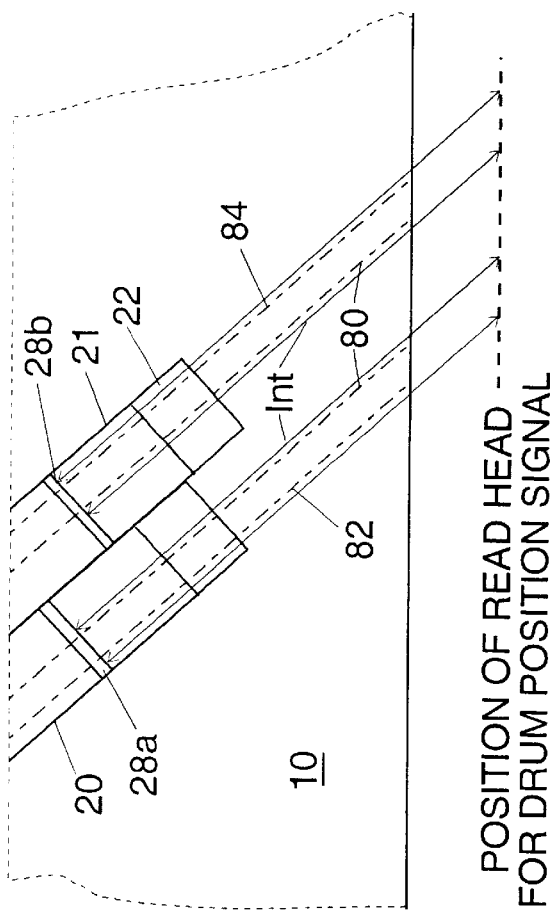
FIG. 5 illustrates the principle of the track following technique used in the invention.

FIG. 5 illustrates the principle of operation of this tracking control. Referring to FIG. 5, Header regions 28a and 28b are shown of fragments near the ends of two adjacent tracks 20 and 21. The ideal paths for the relevant head along these tracks are shown by the dot-dash lines 80. The ATF circuit measures the time interval Int between the occurrence of the drum position signal, which is generated as one of the heads approaches the tape, and the detection of a reference signal comprising the Header region 28a or 28b. When the heads are correctly following the paths 80, the time Int will match a preset reference value. If the head reaches the edge of the tape before the tape has advanced enough to line a track up with the head, as shown by the dot-dash line 82 on track 20, the measured time interval Int will be less than this reference value; on the other hand, if the tape has advanced too far, as shown by the dot-dash line 84 on the track 21, the interval Int will be greater than the reference value. By respectively speeding up or slowing down the capstan servo 45, the ATF circuit 49 can correct these tracking errors and keep the heads on the ideal paths 80.

In practice greater reliability can be obtained by measuring the time intervals between the drum position signal and the detection of more than one reference signal (Header region 28). Thus, for example, in the embodiment described below, this time interval is measured for both the first and last Header regions in each track (i.e. in fragments 0 and 63), and the mean value of these two measurements is used to control the tape movement.

Figure 6:
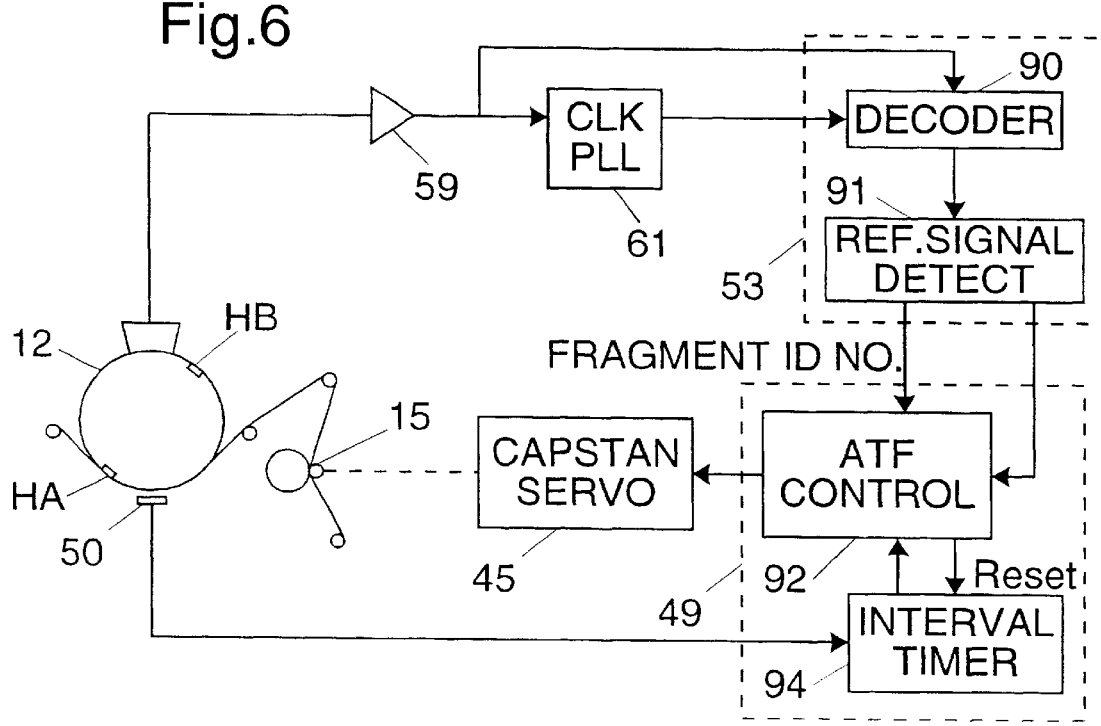
FIG. 6 is a block schematic diagram of track following circuits forming part of the apparatus of FIG. 4.

The track following circuits including the ATF circuit 49 are shown in more detail in FIG. 6. Referring to FIG. 6 (from which the head and record/playback switches have been omitted for clarity) and as described above, the track signals from the heads HA and HB are fed via the amplifier stage 59 to the clock recovery circuit 61 and to the formatter/separator unit 53. The circuit 61, which incorporates a phase-locked loop, provides the unit 53 with a clock signal, which is received together with the track signals by a decoder 90. Decoded signals are in turn supplied to a reference signal detector 91. As described below, this detector identifies fragment Headers containing a fragment ID of 0 and 63 in each track, and supplies a pulse at the time of detection of these reference signals, together with the value of the fragment ID, to an ATF controller 92 located in the ATF circuit 49. An interval timer 94 in the ATF circuit 49 receives the drum position signal from the pulse generator 50 associated with the drum 12, and measures time intervals starting with each drum position signal until the timer is reset by the ATF controller 92. This controller 92 is coupled to the interval timer 94 to latch its time measurement upon receipt of each reference signal detection pulse, and supplies a control signal to the capstan servo 45 in dependence upon comparison of the latched time measurements with the reference value.

Figure 7:
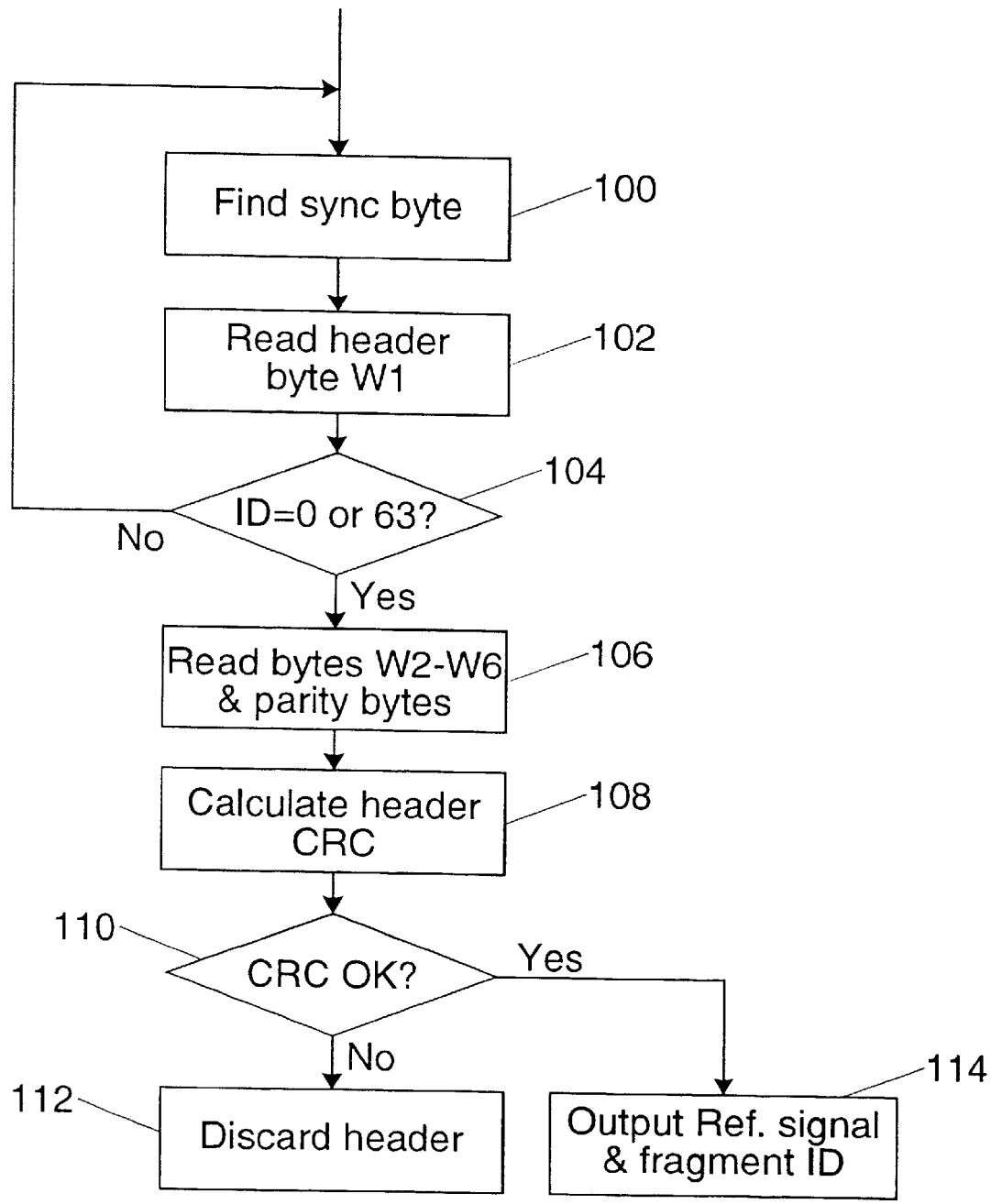
FIG. 7 is a flow chart of the operation of a reference signal detector in the track following circuits of FIG. 6.

The operation of the reference signal detector 91 is shown in the flow chart of FIG. 7. Referring to FIG. 7, at step 100 the detector awaits occurrence of a predetermined unique bit pattern which is characteristic of a sync byte at the beginning of a Header region. Upon occurrence of this pattern, the detector advances to step 102, where the first information byte W1, containing the fragment ID, is read. At step 104 the ID is examined to establish whether the Header region belongs to either fragment 0 or fragment 63. If not, the detector returns to step 100 to await the sync byte at the start of the next fragment.

If the Header region is part of either of these fragments, the detector proceeds to read the remaining information bytes W2 to W6 and the parity bytes, at step 106. The CRC value for the Header is calculated at step 108, and tested at step 110 by comparison with the value contained in the parity bytes. If the CRC value is incorrect, the header data are discarded at step 112. Otherwise the detector outputs the reference signal detection pulse and the fragment ID to the ATF controller 92 at step 114.

Figure 8:
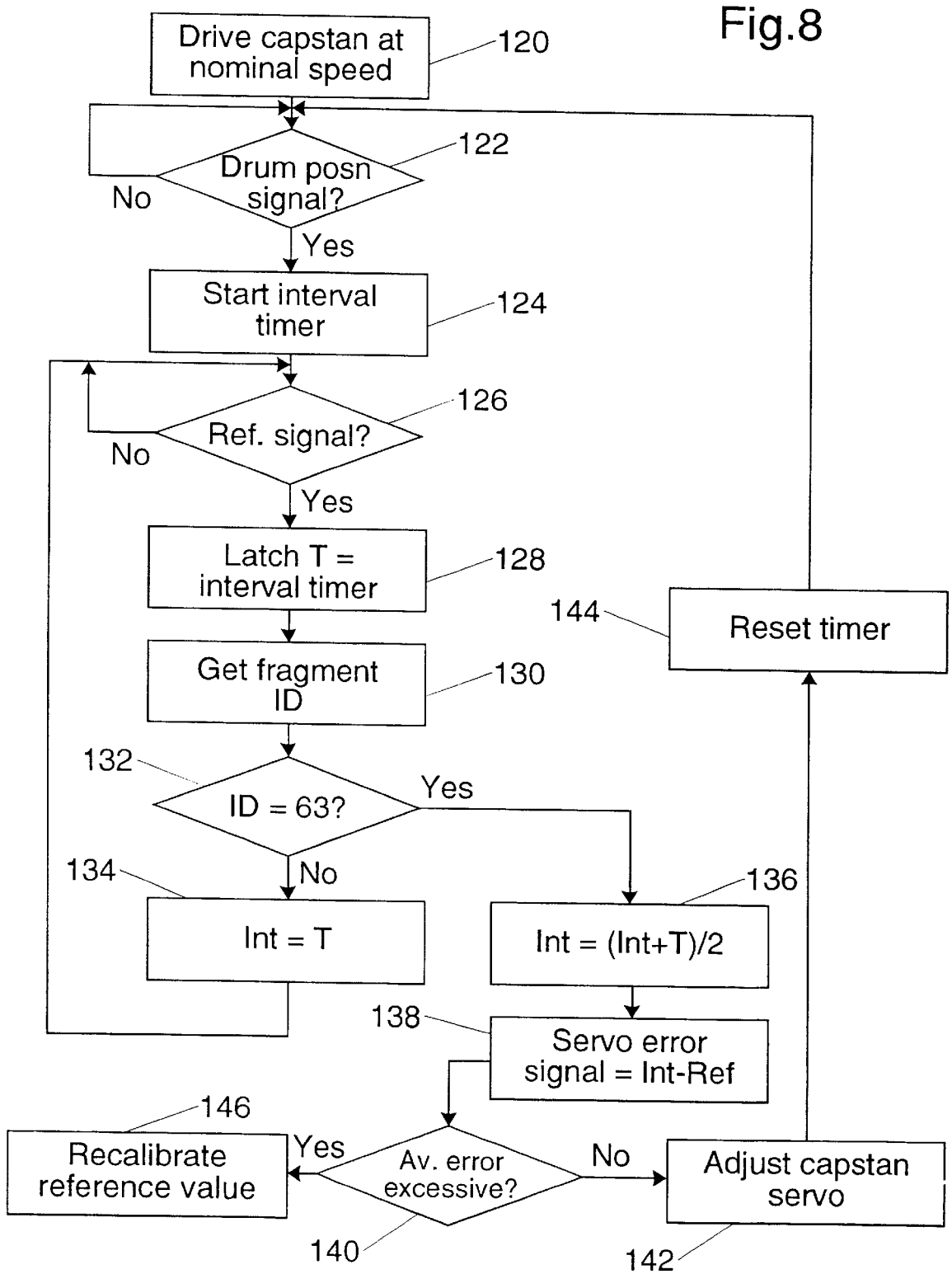
FIG. 8 is a flow chart of the normal operation of an automatic track following (ATF) circuit in the apparatus of FIG. 4.

During normal operation (i.e. when a reference value for the time interval Int has been established), the ATF circuit 49 operates as shown by the flow chart of FIG. 8. Referring to FIG. 8, the ATF circuit (including the ATF controller 92 and the interval timer 94) normally causes the capstan servo 45 to move the tape at its nominal speed for storage and retrieval of data, as indicated at step 120. At step 122 the ATF circuit repeatedly tests for receipt of a drum position signal from the pulse generator 50, and upon occurrence of this signal it advances to step 124 where the interval timer 94 commences a timing operation. The ATF circuit now proceeds to step 126, where it again repeatedly executes a test, this time for receipt of a reference signal detection pulse from the detector 91. When this pulse occurs the procedure continues to step 128, where the ATF controller 92 latches the value T at that instant of the interval measured by the timer 94, and then to step 130 where it receives the fragment ID from the detector 91. At step 132 the controller tests whether the fragment has an ID of 63. If not (i.e. the fragment ID is 0), the procedure sets the interval Int to an initial value of T, and then returns to step 126 to await receipt of the next reference signal detection pulse which should be for the Header region of fragment 63.

If the fragment ID received at step 130 is 63, a final value for the interval Int is calculated at step 136 in accordance with the relationship $$Int=(Int+T)/2$$

that is the mean of the values T latched by the controller 92 for each of the reference signals (Header regions) in the current track.

This value of the interval Int is used at step 138 to calculate an error feedback signal for the capstan servo 45 as the difference between Int and the reference value for this interval. The average value of this error signal (averaged for example over the previous ten tracks) is tested at step 140 to assess whether it is excessive, i.e. indicative that the capstan servo has lost lock, as can happen for example if there has been a significant change in the position of the tracks on the tape, as explained below. If the error signal is not excessive, the operation of the capstan servo 45 is adjusted at step 142 in accordance with the magnitude and sense of the error signal, in order to keep the tracks on the tape aligned with the heads, before the procedure returns to step 122 via step 144 where the interval timer 94 is reset.

This adjustment will maintain the heads HA, HB in alignment with the tracks on the tape so long as there is no excessive change in the position of the tracks on the tape. However, such changes can occur, for example at a transition between data recordings made at different times or on different machines. When such a change occurs and the discontinuity in track position is too great, the test at step 140 will determine that the error signal is excessive, in which case that procedure implements step 146 to recalibrate the reference value for the changed circumstances. This step is likewise perfomed when a tape is being read for the first time after loading into the mechanism, in order to determine an initial value for the reference value, when an excessive error rate is encountered in the decoded data by the MDA processor 65, and possibly after preset time periods (e.g. every few minutes) as a precaution.

Figure 9:
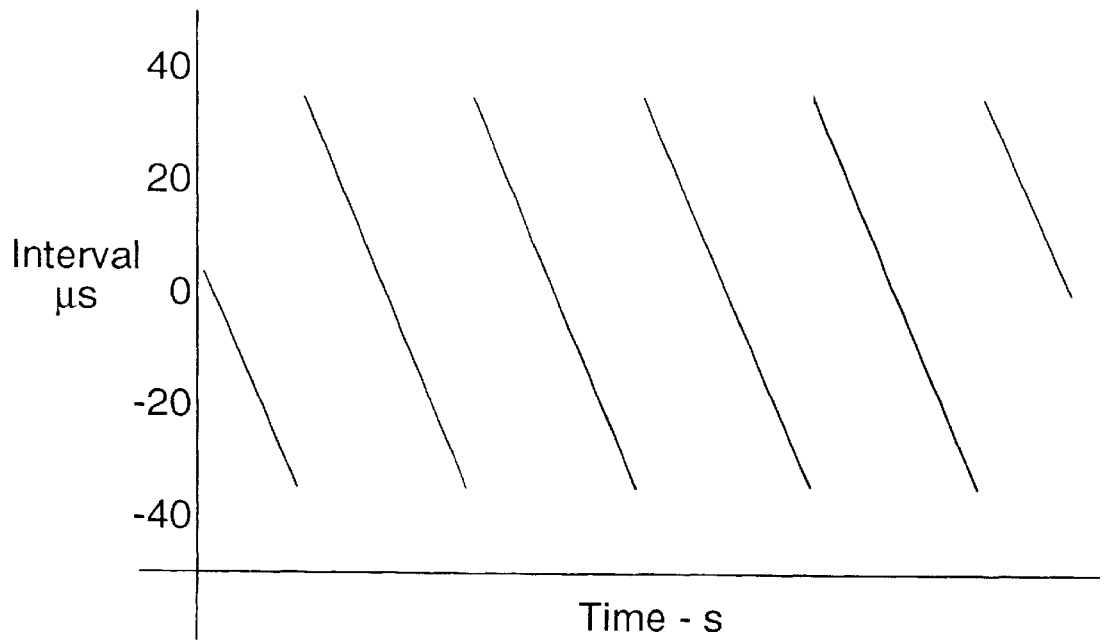
FIG. 9 is a schematic timing diagram illustrating the operation of the track following circuits during a calibration phase.

In outline step 146 involves operating the capstan servo 45 such that the tape is moved past the drum 12 at a speed different from its nominal speed during storage and retrieval of data. The time interval between occurrence of drum position signals and detection of reference signals on the tape is measured, generally as described above. However, because the tape is moving at a speed which is not essentially the normal speed, the value of this measurement will drift cyclically through all possible values between a maximum and minimum corresponding to possible extremes of misalignment between the heads HA, HB and the tracks recorded on the tape, as shown schematically in the timing diagram of FIG. 9. Multiple, frequent measurements are made of the time interval throughout its range of variation, and the mean of these measurements is then calculated to determine the revised reference value. This procedure is shown in detail in FIG. 10.

Figure 10:
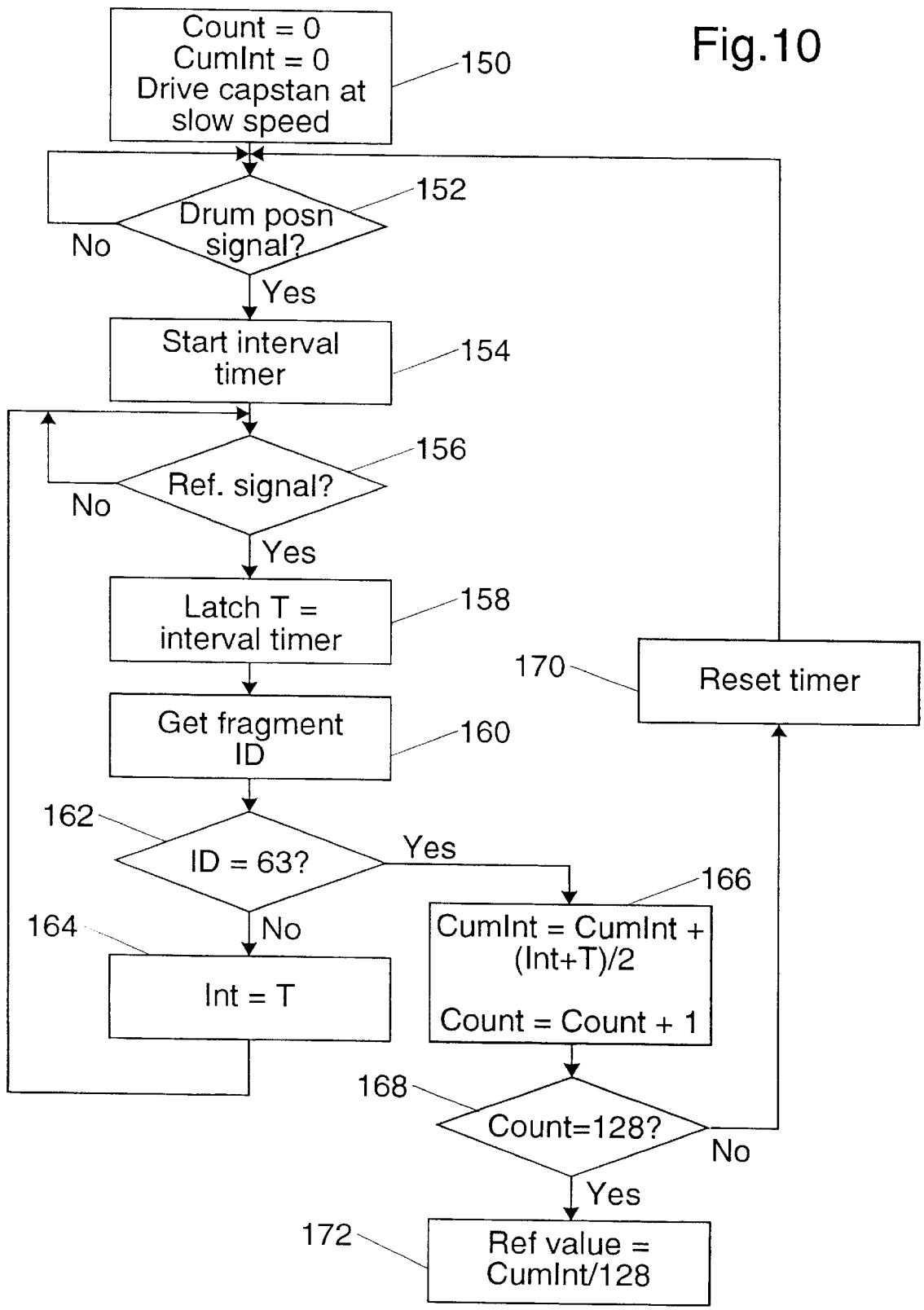
FIG. 10 is a flow chart of the operation of the ATF circuit during the calibration phase.

Referring to FIG. 10, at step 150 the values of two variables Count and CumInt are set to zero, and the ATF circuit causes the capstan servo 45 to move the tape at a speed different from (typically less than) its nominal speed. The actual speed is a compromise between the time taken to detect sufficient reference signals to recalibrate the reference value, and the length of tape which passes the drum 12 before the recalibration is accomplished. The DDS format provides that storage of data will always involve writing a specified minimum number of frames in one storage operation, and it is therefore desirable for the recalibration to be accomplished before that number of frames has passed the drum. A typical value for the tape speed during recalibration is 80% of the nominal speed during storage and retrieval of data.

Steps 152 to 164 of FIG. 10 are generally analogous to steps 122 to 134 of FIG. 8, and therefore need not be described in detail. However, if the fragment ID received at step 160 is 63, the procedure of FIG. 10 advances to step 166 where a cumulative interval is updated in the variable in the variable CumInt in accordance with the relationship $$CumInt=CumInt+(Int+T)/2$$

that is by adding the mean of the values T latched by the controller 92 for each of the reference signals (Header regions) in the current track. The variable Count is incremented by one, and the procedure then continues to step 168 where the value of Count is compared with the total number of measurements required to accomplish recalibration; in the present example this total is 128. If this total number of measurements has not been acquired, the procedure simply returns to step 152 to await the next drum position signal, via step 170 where the interval timer 94 is reset. Otherwise the recalibrated reference value is obtained at step 172 by dividing the value of CumInt by 128 (i.e. by calculating the mean of the measurements involved in the recalibration).

The system controller 43 is arranged to note the tape position at which a recalibration of the reference value became necessary (e.g. because of a transition between different recordings). When a new reference value has been obtained (and before the old reference value is discarded), the system controller 43 requests the deck controller 52 to rewind the tape back to a point before the noted tape position. Normal reading of the tape is then resumed, initially still using the old reference value in the tracking procedure of FIG. 8; when the tape reaches the previously-noted position, the new reference value is substituted for the old one, so that tracking will continue correctly beyond that position.

Various modifications may be made to the embodiment as described above. Thus, for example, the invention may be used with a reference signal comprising any format of fragment or block header instead of the one shown in FIG. 3, or indeed comprising any recognizable bit pattern which is known or arranged to occur at a predictable position or positions along a track. Particular headers used may be different from the first and last in a fragment (as described above), and the system may be arranged to choose whichever headers are least affected by any temporary perturbation of the tape reading process. Fewer than 128 measurements may be made in recalibrating the reference value, possibly in the order of thirty measurements. In moving the tape at a different speed from normal for recalibration of the reference value, the tape may be moved in reverse (including at a rate which is the same magnitude as, but in the opposite direction to, the rate during normal operation). It will be noted that the procedure shown in FIG. 7 for detecting reference signals will involve some time delay between passing of the reference signal area under the relevant head HA, HB and generation of the reference signal detection pulse by the detector 91. However, this delay will typically be constant, and affects both the recalibration procedure and normal operation, and thus will automatically be compensated.

What is claimed is:

1. A method of controlling advancement of a medium carrying data relative to a rotating transducer for retrieving data from said medium while said medium is advancing relative to the transducer at a speed associated with normal retrieval of data and while said medium is advancing at a speed substantially different from the speed nominally associated with normal retrieval of data and advancement, said data being recorded in tracks extending diagonally across said medium, each said track including at least one reference signal, the method comprising the steps of:

generating a position signal at a predetermined angular position of said transducer in each revolution thereof;

measuring delay between occurrences of said position signal and detection of said one reference signal;

generating a speed command signal for the speed that is substantially different from that occurring during normal retrieval of data from said medium, the speed command signal being independent of the generated position signal, responding to the speed command signal to cause relative motion between said medium and said transducer to occur at the speed substantially different from that occurring during normal retrieval of data from said medium;

acquiring multiple measurements of said delay while the medium is advancing in response to the speed command signal at the speed that is substantially different from that occurring during normal data retrieval from said medium; determining a reference value in dependence upon said multiple measurements only while the medium is advancing in response to the speed command signal at the speed substantially different from that occurring during normal retrieval of data from said medium; and moving said medium relative to said transducer so as to maintain said measured delay in a predetermined relationship to said reference value while the medium is advancing at the speed occurring during normal retrieval of data from said medium.

2. The method of claim 1, wherein said determining step comprises determining said reference value in dependence upon a mean value of said multiple measurements.

3. The method of claim 1, wherein the substantially different speed is a speed lower than that occurring during normal retrieval of data from said medium.

4. The method of claim 3, wherein said lower speed in said step of causing relative motion is of the order of 80% of said speed during normal retrieval of data.

5. The method of claim 1, wherein each said track includes at least two reference signals and said measuring step comprises measuring delay between occurrences of said position signal and detection of at least one of said at least two reference signals.

6. The method of claim 5, wherein said measuring step comprises measuring said delay relative to detection of a plurality of said reference signals.

7. The method of claim 5, wherein said measuring step comprises measuring said delay relative to detection of a reference signal at different locations on different respective tracks.

8. The method of claim 1, wherein said one reference signal detected in said measuring step comprises a predetermined data pattern occurring in data recorded in said tracks.

9. The method of claim 8, wherein said data are split into successive portions each having a header, and said one reference signal detected in said measuring step comprises at least part of a header.

10. The method of claim 1, wherein said step of moving said medium relative to said transducer comprises controlling the speed said tape advances.

11. The method of claim 1 wherein the reference signal is a series of synchronous pulses and the motion between said media and said transducer is such that the measured delay values drift cyclically between the synchronization pulses from maximum to minimum delay values while the medium advances at the speed that is substantially different from the speed during normal data retrieving and the multiple measurements made are acquired when the motion between said medium and said transducer is such that the measured delay values drift cyclically between the synchronization pulses from maximum to minimum delay values.

12. The method of claim 1 wherein the speed command signal is a recalibration signal.

13. The method of claim 12 wherein the recalibration signal is derived in response to at least one of the following occurrences: (1) when the medium is being read for the first time by a mechanism including the rotating transducer, (2) when an excessive error rate is encountered in data decoded by the transducer, and (3) when a preset time period has elapsed.

14. Apparatus for controlling advancement of a medium carrying data relative to a rotating transducer for retrieving data from said medium while said medium is advancing relative to the transducer at a speed nominally associated with normal retrieval of data and while said medium advances at a speed substantially different from the speed associated with normal retrieval of data, said data being recorded in tracks extending diagonally across said medium, each said track including at least one reference signal, the apparatus comprising:

means for advancing said medium relative to motion of said transducer across the tracks while the medium is being advanced at the normal speed and at the speed substantially different from the normal speed;

means for detecting said reference signals while the medium is being advanced at the normal speed and at the speed substantially different from the normal speed;

means for generating a position signal at a predetermined angular position of said transducer in each revolution thereof while the medium is being advanced at the normal speed;

means responsive to said detection means and said signal generating means for measuring delay between occurrences of said position signal and detection of said reference signal while the medium is being advanced at the normal speed;

means for generating a speed command signal for the speed that is substantially different from that occurring during normal retrieval of data from said medium, the value of the speed command signal being independent of the generated position signal;

means responsive to the speed command signal for causing relative motion between the medium and the transducer to occur at the speed substantially different from that occurring during normal retrieval of data from the medium;

the means for measuring delay being arranged for acquiring multiple measurements of said delay while the medium is advancing in response to the speed command signal at the speed that is substantially different from that occurring during normal data retrieval from said medium;

means responsive to said measured delay for controlling said motion producing means to maintain said measured delay in a predetermined relationship to a reference value while the medium is being advanced at the normal speed; and means for determining said reference value in dependence upon said multiple measurements of said delay made by said delay-measuring means only while the medium is being advanced in response to the speed command signal at the speed substantially different from the normal speed.

15. The apparatus of claim 14, wherein said determining means determines said reference value in dependence upon a mean value of said multiple measurements.

16. The apparatus of claim 14, wherein the substantially different speed is lower than that occurring during normal retrieval of data from said medium.

17. The apparatus of claim 16, wherein said lower speed is of the order of 80% of said speed during normal retrieval of data.

18. The apparatus of claim 14, wherein each said track includes at least two reference signals.

19. The apparatus of claim 18, wherein said delay-measuring means measures said delay relative to detection of a plurality of said reference signals.

20. The apparatus of claim 18, wherein said delay-measuring means measures said delay relative to detection of a reference signal at different locations on different respective tracks.

21. The apparatus of claim 14, wherein said reference signal comprises a predetermined data pattern occurring in data recorded in said tracks.

22. The apparatus of claim 21, wherein said data are split into successive portions each having a header, and said reference signal comprises at least part of a header.

23. The apparatus of claim 14, wherein said motion-producing means produces said relative motion by controlling the speed said tape advances.

24. The apparatus of claim 14 wherein the reference signal is a series of synchronous pulses and said means for producing motion is controlled by said controlling means such that the measured delay values drift cyclically between the synchronization pulses from maximum to minimum delay values, and the multiple measurements are acquired when the motion between said media and said transducer is such that the measured delay values drift cyclically between the synchronization pulses from maximum to minimum delay values.

25. The method of claim 14 wherein the means for generating the speed command signal is arranged to be responsive to at least one of the following occurrences: (1) when the medium is being read for the first time by a mechanism including the rotating transducer, (2) when an excessive error rate is encountered in data decoded by the transducer, and (3) when a preset time period has elapsed.

26. Apparatus for controlling advancement of a medium carrying data relative to a rotating transducer for retrieving data from said medium while said medium is advancing relative to the transducer at a speed nominally associated with normal retrieval of data and while said medium advances at a speed substantially different from the speed associated with normal retrieval of data, said data being recorded in tracks extending diagonally across said medium, each said track including at least one reference signal, the apparatus comprising:

a drive for advancing said medium relative to motion of said transducer across the tracks while the medium is being advanced at the normal speed and at the speed substantially different from the normal speed;

a detector for detecting said reference signals while the medium is being advanced at the normal speed and at the speed substantially different from the normal speed;

a signal generator for generating a position signal at a predetermined angular position of said transducer in each revolution thereof while the medium is being advanced at the normal speed;

circuitry connected to be responsive to said detector and said signal generator for measuring delay between occurrences of said position signal and detection of said reference signal while the medium is being advanced at the normal speed; the circuitry being arranged for generating a speed command signal for the speed that is substantially different from that occurring during normal retrieval of data from said medium, the value of the speed command signal being independent of the generated position signal; the circuitry being arranged to be responsive to the speed command signal for controlling the drive for causing relative motion between the medium and the transducer to occur at the speed substantially different from that occurring during normal retrieval of data from the medium; the circuitry for measuring the delay being arranged for acquiring multiple measurements of said delay while the medium is advancing in response to the speed command signal at the speed that is substantially different from that occurring during normal data retrieval from said medium; the circuitry being arranged to be responsive to an indication of said measured delay for controlling said drive to maintain said measured delay in a predetermined relationship to a reference value while the medium is being advanced at the normal speed; and the circuitry being arranged for determining said reference value in dependence upon said multiple measurements of said delay made by said circuitry only while the medium is being advanced in response to the speed command signal at the speed substantially different from the normal speed.

* * * * *